(12) United States Patent
Chludek et al.

(10) Patent No.: US 7,846,056 B2
(45) Date of Patent: Dec. 7, 2010

(54) DRIVE ASSEMBLY WITH INTERMEDIATE SHAFT AND COUPLING UNIT

(75) Inventors: Adrian Chludek, St. Augustin (DE);
Christian Gasch, Lohmar (DE);
Theodor Gassmann, Siegburg (DE);
Artur Grunwald, Nümbrecht (DE)

(73) Assignee: GKN Driveline International GmbH, Lohmar (DE)

( * ) Notice: Subject to any disclaimer, the term of this patent is extended or adjusted under 35 U.S.C. 154(b) by 496 days.

(21) Appl. No.: 11/949,368

(22) Filed: Dec. 3, 2007

(65) Prior Publication Data
US 2009/0088287 A1    Apr. 2, 2009

(30) Foreign Application Priority Data
Dec. 1, 2006  (DE)  ....................... 10 2006 057 218

(51) Int. Cl.
*F16H 48/20*  (2006.01)
(52) U.S. Cl. .................................... 475/231
(58) Field of Classification Search ................ 475/231
See application file for complete search history.

(56) References Cited

U.S. PATENT DOCUMENTS

| | | | |
|---|---|---|---|
| 4,966,249 A * | 10/1990 | Imaseki | 180/233 |
| 5,080,210 A | 1/1992 | Hagiwara | |
| 5,145,470 A * | 9/1992 | Hagiwara | 475/230 |
| 6,290,623 B1 * | 9/2001 | Morse | 475/231 |
| 7,390,278 B2 * | 6/2008 | Krisher | 475/231 |
| 2005/0026732 A1 | 2/2005 | Krisher | |

FOREIGN PATENT DOCUMENTS

| | | |
|---|---|---|
| DE | 101 51 713 B4 | 7/2002 |
| EP | 0 856 676 A1 | 8/1998 |
| EP | 1 502 800 A1 | 2/2005 |
| GB | 2 235 502 A | 8/1999 |
| WO | WO 2006/040343 | 4/2006 |

* cited by examiner

*Primary Examiner*—Ha D. Ho
(74) *Attorney, Agent, or Firm*—Rader, Fishman & Grauer, PLLC (57) ABSTRACT

A drive assembly for use between an axle differential and a sideshaft comprises an intermediate shaft that is rotatably supported around a rotation axis and has a first end fixedly connected to an output gear of the axle differential and a second end fixedly connected at least indirectly to the sideshaft. A controllable coupling unit comprises a coupling cage with outer plates and a coupling hub with inner plates. The coupling cage is rotatably supported around the rotation axis relative to a bearing support. The coupling hub is connected to the intermediate shaft. The outer plates and the inner plates are arranged so as to axially alternate and jointly form a plate package. The coupling cage extends in the axial direction from the differential carrier to the bearing support and is sealed by first and second rotary seals.

22 Claims, 9 Drawing Sheets

DRIVE ASSEMBLY WITH INTERMEDIATE SHAFT AND COUPLING UNIT

TECHNICAL FIELD

The invention relates to a drive assembly with an intermediates shaft and a coupling unit for being used in the driveline of a motor vehicle. Such drive assemblies serve to transmit torque between an axle differential and a sideshaft of a motor vehicle, more particularly in front wheel drive vehicles with a transversely mounted engine. The coupling unit permits an active control of the distribution of torque between the sideshaft gears of the axle differential and between the sideshafts of the motor vehicle respectively.

BACKGROUND OF THE INVENTION

From DE 103 12 347 A1 there is already known a differential assembly with an intermediate shaft and a controllable coupling unit for the rear axle of a motor vehicle, constituting the main driving axle.

U.S. Publication No. 2006/0211532 A1 proposes a drive assembly with a gearbox, coupling and differential for a front axle. The assembly comprises an intermediate shaft which is also known as a link shaft and which, in respect of drive, connects the differential drive to a sideshaft. For locking the differential effect between the two sideshafts, there is provided a controllable coupling whose inner plate carrier is connected to the intermediate shaft in a rotationally fixed way and whose outer plate carrier is connected to the differential carrier in a rotationally fixed way. The coupling cage is supported in a rotationally fixed way in a coupling housing which is firmly attached to the differential housing. For actuating the multi-plate coupling, there is provided an actuator in the form of a ball ramp assembly which is controlled by an electric motor flanged to the coupling housing. The electric motor is controlled by an electronic control unit (ECU).

From U.S. Pat. No. 5,083,986 there is known a controllable coupling assembly with a pilot coupling, a main coupling, an electro-magnet, an anchor disc and a ramp mechanism. By actuating the electromagnet, there is attracted the anchor disc, so that the pilot coupling is loaded in the sense of being closed. As a result, the two ramp discs are rotated relative to one another and spread, as a result of which the main coupling is loaded in the sense of being closed. By way of example, there are proposed several applications for the coupling assembly, i.e. as a lock in a central differential, as an axle differential or a transfer box or a so-called hang-on coupling between a propeller shaft and a rear axle differential.

U.S. Pat. No. 6,109,408 proposes a similar electro-magnetically controllable coupling assembly with a pilot coupling and a main coupling. It shows different embodiments for the coupling assembly inside a propeller shaft of a motor vehicle. By closing the coupling, the rear axle is coupled to the driveline, which is also known as the "hang-on" or "on demand" concept. Inside a stationary receiving part for the magnetic coil, the coupling hub is rotatably supported, with the receiving part being connected to the vehicle body and housing of the rear axle differential.

From U.S. Publication No. 2005/0026732 A1 there is known a drive assembly with an intermediate shaft and a coupling unit. The coupling unit comprises a coupling cage which, in respect of drive, is connected to the differential carrier of the axle differential. The coupling unit is arranged in a two-part coupling housing which is flanged to the gearbox housing. In the coupling housing, there is provided an axial through-aperture towards the gearbox housing to allow the passage of a lubricant.

Because the available installation space is small, integrating active locking systems into the main driving axle of a motor vehicle is often complicated. In addition, existing components to be connected to the locking systems may have to be redesigned at additional expense, as a result of which the number of variants and thus costs are increased.

SUMMARY OF THE INVENTION

A drive assembly is provided with an intermediate shaft and a controllable coupling unit for being used in the axle drive of a motor vehicle, which assembly has a compact design and which can easily be integrated into existing drive concepts.

The drive assembly is intended for use in the axle drive of a motor vehicle between an axle differential and a sideshaft, comprising an intermediate shaft which is supported so as to be rotatable around an axis of rotation A, whose first end is connected to an output gear of the axle differential in a rotationally fixed way and whose second end is connected at least indirectly to the sideshaft in a rotationally fixed way; a controllable coupling unit which is arranged coaxially relative to the intermediate shaft and which comprises a coupling cage with outer plates and a coupling hub with inner plates, which coupling cage is connected in a rotationally fixed way to a differential carrier of the axle differential and which coupling cage is rotatably supported around the axis of rotation relative to a bearing support element, and which coupling hub is connected in a rotationally fixed way to the intermediate shaft, wherein the outer plates and the inner plates are arranged so as to axially alternate and jointly form a plate package; the coupling cage extends in the axial direction from the differential carrier to the bearing support and, at its end facing the differential, it is sealed by means of a first rotary seal relative to a housing of the axle differential and, at its end facing the bearing support, it is sealed by means of a second rotary seal relative to the bearing support, wherein the coupling cage forms a closed housing.

The advantage of the inventive drive assembly consists in having a compact and simple design, thus allowing it to be easily integrated into existing drive concepts. Because the coupling cage extends axially from the differential carrier to the bearing support and forms a closed housing, there is no need for any additional housing parts surrounding the coupling cage. The coupling cage itself constitutes a casing or housing. In addition to functioning as an outer plate carrier, the coupling cage also has a sealing effect because, as a result of functioning as a housing it prevents dirt from entering the housing and lubricant from escaping from the coupling. The coupling cage which preferably comprises an outwardly closed surface, at its differential end, is sealed towards the differential housing by means of the first rotary seal and, at its joint end, it is sealed towards the support element by means of a second rotary seal. The term "rotary seal" refers to a seal which seals two components relative to one another which rotate relative to one another. The first rotary seal, more particularly, can be a non-contacting shaft sealing ring, and the second rotary seal is preferably provided in the form of a sealing ring which is firmly connected to one of the two components, either the coupling cage or the bearing support, and which covers an annular gap formed between said two components. For example, the sealing ring can be secured to an outer face of the coupling cage and axially extend over a cylindrical outer face of the bearing support, so that dirt is prevented from entering the annular gap.

According to a preferred embodiment, the coupling unit comprises a magnet coil, a pilot coupling which can be controlled by the magnet coil, a ramp mechanism which can be actuated by the pilot coupling and a main coupling which can be actuated by the ramp mechanism and which comprises the coupling cage and the coupling hub. Said coupling unit is advantageous in that it comprises the feature of self-intensification of the actuating force, because for actuating the pilot coupling, there is required a relatively low amperage only which, preferably, amounts to less than three ampere. Such a low amperage is sufficient for actuating the pilot coupling which, thereafter, closes the main coupling via the ramp mechanism. There is no need for a separate electric motor for actuating the coupling unit, which has an advantageous effect on packaging.

The coupling cage preferably comprises an attaching sleeve connected to the differential carrier in a rotationally fixed way, a bottom part which adjoins the attaching sleeve, and a tubular part which adjoins the bottom part and whose free end is sealed relative to the bearing support. According to a preferred embodiment, the attaching sleeve comprises longitudinal teeth which can be inserted into corresponding counter teeth of the differential carrier. This measure permits an easy assembly procedure and there is no need for a complicated housing interface. From a production-technical point of view, it is particularly advantageous if the coupling cage is produced in one piece, more particularly so as to be undercut-free. Of course, some of said components can also first be produced separately and subsequently connected to one another. Furthermore, the coupling unit comprises a cover element which closes the coupling cage and rotatably supports same via a bearing relative to the support carrier element around the axis of rotation, with the coupling cage, the cover element and the coupling hub enclosing an outwardly sealed annular chamber. In a preferred embodiment, the pilot coupling, the ramp mechanism and the main coupling are arranged inside the annular chamber, with the magnet coil being arranged outside the annular chamber.

According to a preferred embodiment, the cover element—if viewed in half a longitudinal section—is C-shaped and forms an annular chamber which is open towards the bearing support and in which there is arranged the magnet coil. The magnet coil is preferably secured to a holding element which axially delimits the annular chamber of the cover element and is firmly connected to the bearing support. More particularly, the holding element is produced out of a ferromagnetic material, so that it is possible that a torus-shaped magnetic field is formed around the magnet coil. The cover element preferably comprises an inner sleeve portion which, by means of a bearing, is supported so as to be rotatable relative to the holding element around the axis of rotation, with the rotating cover element being supported relative to the stationary holding element in such a way that there are formed minimum radial gaps between the two above-mentioned components. As an alternative to the cover element, the coupling cage can also be supported relative to the bearing support by means of its tubular part. In one embodiment, the intermediate shaft, at its end removed from the axle differential, is rotatably supported by a bearing relative to the cover element and the bearing support respectively, so that it is possible to support secondary moments of the shaft.

The coupling hub is preferably provided in the form of a sleeve which is rotatably held on the intermediate shaft by longitudinal teeth. Towards the joint, the tooth runout of the longitudinal teeth forms a first axial stop. The coupling cage is preferably rotatably supported on the coupling hub by means of a bearing received in the bottom part, and sealed relative to said coupling hub by a rotary seal. A shoulder on the coupling hub, against which shoulder there is supported the inner bearing race of the bearing, forms a second axial stop for the coupling hub. Between the intermediate shaft and the coupling hub, there is preferably provided a sealing ring, more particularly an O-ring which is positioned in an inner annular groove of the coupling hub and which outwardly seals the differential chamber filled with transmission oil. In principle, the coupling hub can also be produced so as to be integral with the intermediate shaft, which would be advantageous from the point of view of reducing the number of parts.

According to one embodiment it is proposed that, on its radial inside, the cover element is sealed by means of a rotary seal relative to the coupling hub and, on its radial outside, by means of a sealing ring relative to the tubular part. In this way, any lubricating or cooling oil contained in the coupling cage is prevented from escaping into the environment and dirt is prevented from entering the annular chamber from the environment.

According to a further preferred embodiment, the holding element and bearing support respectively are provided with a cable duct which allows the passage of an electric cable controlling the magnet coil. At the same time, the cable duct functions as rotary securing means for the holding element received in a bore of the bearing support. The bearing support preferably comprises at least one holding arm for being connected to an engine component of the motor vehicle. Apart from connecting the bearing support, by means of its holding arm, to the engine component, there is no need for any further adaptive measures regarding the inventive drive assembly.

According to a further inventive embodiment, there is provided an electronic control unit which, as a function of at least one vehicle parameter, controls the degree of locking of the coupling unit and at least one further system of the motor vehicle, with the degree of locking of the coupling unit being set as a function of the traction requirements of the wheels connected, in respect of drive, to the sideshafts. By locking the coupling, the speed of the intermediate shaft is adapted to the speed of the differential carrier, so that there is generated a locking effect between the sideshafts and thus between the two wheels. According to a preferred embodiment, the electronic control unit comprises a plurality of modules for controlling an associated control system of the motor vehicle, more particularly an electronic stabilisation program (ESP) for controlling the driving dynamics of the motor vehicle. Alternatively or in addition, the electronic control unit can carry out, more particularly, a control function of the engine management system and/or of a gearbox management system and/or of an anti-lock system of the brakes and/or of a traction control system of the wheels. By functionally integrating the control systems, it is possible to eliminate the need for an additional control unit for the coupling unit. Using a coupling unit with a pilot coupling and a main coupling is particularly advantageous for electronic integration purposes, because the control process requires only a low amperage of less then five ampere, more particularly of only approximately three ampere which can be quite easily generated by an electronic control unit for the driving dynamics of the motor vehicle.

These and other features and advantages of this invention will become more apparent to those skilled in the art from the detailed description of a preferred embodiment. The drawings that accompany the detailed description are described below.

BRIEF DESCRIPTION OF THE DRAWINGS

The invention can be better understood on reading the following description given purely by way of example and made with reference to the accompanying drawing.

DETAILED DESCRIPTION OF A PREFERRED EMBODIMENT

Figure 1:
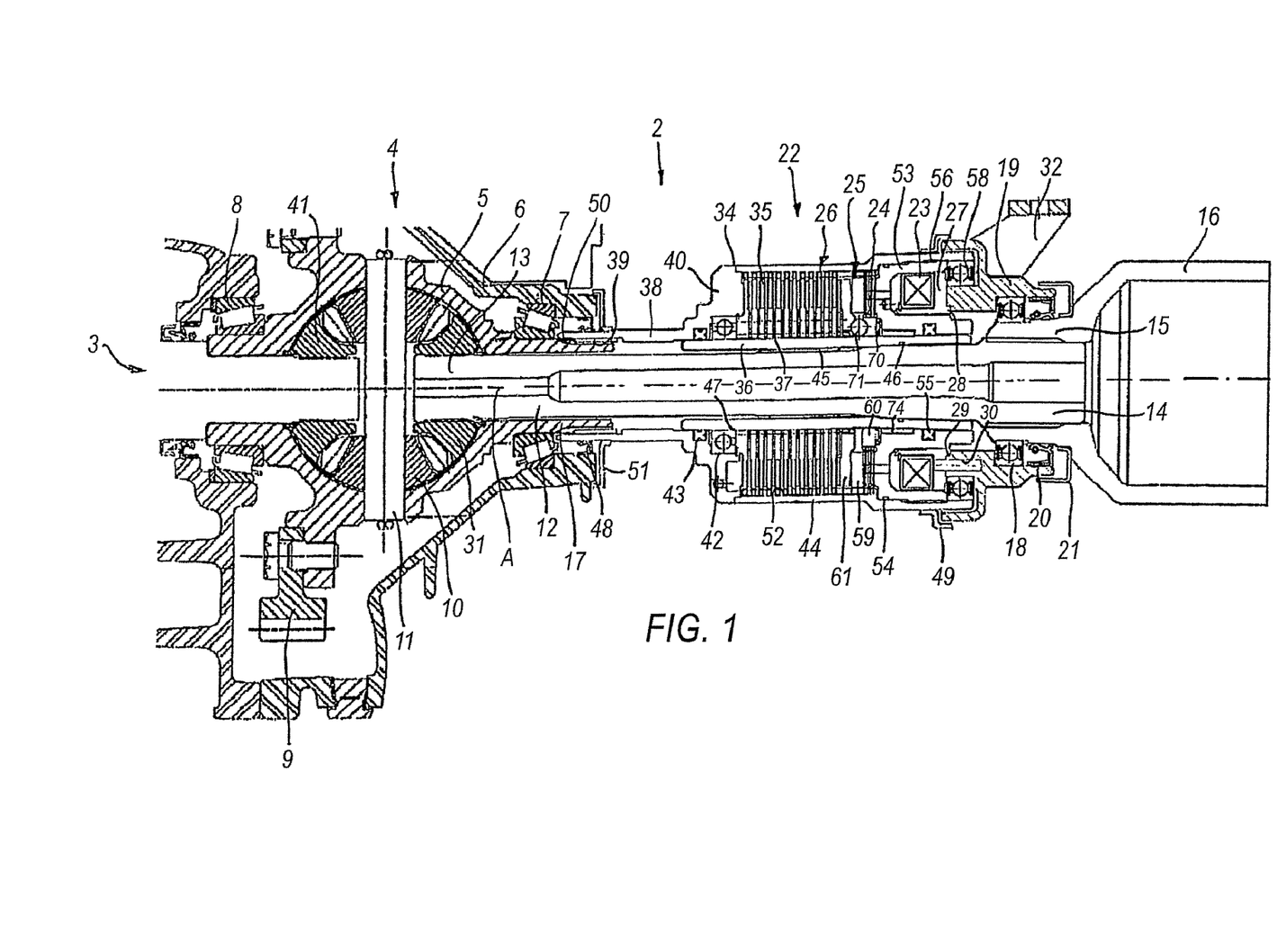
FIG. 1 is a longitudinal section through an inventive drive assembly in a first embodiment.

FIG. 1 shows an inventive drive assembly 2 which is used in the driving axle 3 of a motor vehicle (not shown) and which serves for locking in a controlled way the differential movement of an axle differential of the driving axle. More particularly, the motor vehicle has a front wheel drive, with the main driving axle being the front axle.

The driving axle 3 which is only partially shown in FIG. 1 comprises an axle differential 4 with a differential carrier 5 which is supported in a housing 6 by two rolling contact bearings 7, 8 so as to be rotatable around the axis of rotation A. The differential carrier 5 is rotatingly drivable by a driving pinion (not shown) via an annular gear 9. In the differential carrier 5, a plurality of differential gears 10 is rotatably held on a journal 11 positioned perpendicularly relative to the axis of rotation A, which differential gears 10 rotate jointly with the differential carrier 5 and which engage two output gears 31, 41 held coaxially relative to the axis of rotation A and rotatably inside the differential carrier 5. The two output gears 31, 41 are coupled to one another as a result of their teeth engaging those of the differential gears 10 and have a differential effect relative to one another. Via an intermediate shaft 12 which will be explained in greater detail below, the first of the two output gears 31 is drivingly connected to a first sideshaft. The second output gear 41 arranged opposite is drivingly connected to the second sideshaft of the front axle. The two sideshafts serve to transmit torque to the front wheels of the motor vehicle. It can be seen that the axle differential 4, in the present embodiment, is provided in the form of a bevel gear differential, with the differential gears 10 and the output gears 31, 41 being provided in the form of bevel gears. Alternatively, the axle differential can be provided in other forms, for example as a crown gear differential.

The intermediate shaft 12 comprises a first end 13 provided with shaft teeth which engage in a rotationally fixed way corresponding counter teeth of the output gear 31. At its opposed second end 14, the intermediate shaft 12 comprises further shaft teeth which, for torque transmitting purposes, are inserted into a toothed hub 15 of an outer joint part 16 of a constant velocity joint (not shown). At its differential end, the intermediate shaft 12 is indirectly supported via the rolling contact bearing 7 relative to the housing 6 so as to be rotatable around the axis of rotation A, with the intermediate shaft 12, at its first end 13, being rotatably supported in a sleeve projection 17 of the differential carrier 5, which sleeve projection 17, in turn, is rotatably supported by the rolling contact bearing 7 in the housing 6. At its joint end, the intermediate shaft 12 is indirectly supported via a bearing 18 relative to a bearing support 19. An annular gap formed between the hub 15 of the outer joint part 16 and the bearing support 19 is sealed by a contacting rotary seal 20 which is provided in the form of a radial shaft sealing ring. In addition, a non-contacting sealing ring 21 is secured on an outer face of the hub 15 and, if viewed in half a longitudinal section, comprises an approximately C-shaped profile, with its outer cylindrical portion axially extending over an annular axial projection of the bearing support 19. It is the purpose of the sealing ring 21 to prevent coarse dirt from entering the annular chamber.

The drive assembly 2, in addition to the intermediate shaft 12, comprises a coupling unit 22 with a coupling cage 34 which receives outer plates 35 in a rotationally fixed and axially displaceable way, as well as a coupling hub 36 which is rotatable relative thereto and which holds inner plates 37 in a rotationally fixed and axially displaceable way. The outer plates 35 and the inner plates 37 are arranged so as to axially alternate and, jointly, form the plate package of the main coupling 26. The further components of the coupling unit 22 are a magnet coil 23, a pilot coupling 24 controllable by the magnet coil 23 and a ramp mechanism 25 which is actuated by the pilot coupling 24 and which actuates the main coupling 26. The coupling unit 22 serves to couple the intermediate shaft 12 to the differential carrier 5. By actuating the main coupling 26 in the sense of closing same, there is achieved—indirectly via the differential carrier 5—a locking effect between the intermediate shaft 12 and, respectively, the first sideshaft and the second sideshaft extending in opposite directions, so that a differential movement between the two sideshafts is reduced, if required.

The coupling unit 22 functions as follows: by activating the magnet coil 23, the anchor plate is pulled towards the magnet coil 23, so that the pilot coupling 24 is actuated in the sense of being closed. The outer plates of the pilot coupling 24 are held in the coupling cage 34 so as to be axially displaceable and rotationally fast, whereas the inner plates of the pilot coupling 24 are held on the profiled outer face of a setting disc 60 in an axially displaceable and rotationally fast way. The setting disc 60 which forms part of the ramp mechanism 25 is rotatably supported on an outer face of the coupling hub 36 and is axially supported via an axial bearing 70 relative to a cover element 53 which is firmly connected to the coupling cage 34. To that extent, by closing the pilot coupling 24, the rotational speed of the setting disc 60 is adapted to the rotational speed of the coupling cage 34, which means that the setting disc 60 rotates relative to the coupling hub 36. In addition to the setting disc 60, the ramp mechanism 25 comprises a pressure disc 61 for loading the plate package of the main coupling 26 which inner plates 37 are connected to the coupling hub 36 in a rotationally fixed way. For this purpose the pressure disc 61 comprises a central bore with an inner profile by means of which it engages a corresponding outer profile of the coupling hub 36. In their end faces facing one another, the setting disc 60 and the pressure disc 61 comprise a plurality of circumferentially distributed ball grooves whose depths decrease. Each two opposed ball grooves, in both directions of rotation, comprise pitches extending in opposite directions and form a pair of tracks for receiving a ball 71. By rotating the setting disc 60 relative to the pressure disc 61, the balls 71 move into regions with a smaller groove depth, so that the pressure disc 61 is displaced towards the plate package 35, 37. In this way, the main coupling 26 is closed.

For torque introducing purposes, the coupling cage 34 comprises a sleeve projection 38 whose free end is connected in a rotationally fixed way via longitudinal teeth 39 to the sleeve projection 17 of the differential carrier 5, and for centring the coupling cage 34 on the longitudinal axis it is proposed that the sleeve projection 38 comprises a ground conical end 50 which cooperates with a conical counter face of the sleeve projection 17 in the region of the tooth run-out. The sleeve projection 38 is adjoined by a bottom part 40 which radially widens the coupling cage 34 and in which there is received a bearing 42 for rotatably supporting the coupling cage 34 on the coupling hub 36, as well as a rotary seal 43. The bottom part 40 is connected to a tubular part 44 which extends axially as far as the bearing support 19 and in which there are received the plate package of the main coupling 26, the ramp mechanism 25, the pilot coupling 24 and the magnet coil 23. The coupling cage extends axially from the differential carrier 5 and the housing 6 respectively, which supports the differential carrier, as far as the bearing support 19. The coupling cage 34 is closed towards the outside and, to that extent, forms a kind of housing around the intermediate shaft 12.

The annular chamber 52 formed between the coupling hub 36 and the coupling cage 34 is sealingly closed by the cover element 53. It can be seen that the pilot coupling 24, the ramp mechanism 25 and the main coupling 26 are arranged inside the annular chamber 52 and that the magnet coil 23 is arranged outside the annular chamber 52. For sealing purposes, an annular seal in the form of an O-ring 54 is provided between an outer circumferential face of the cover element 53 and an inner face of the cylindrical portion 44. On the radial inside, there is arranged a rotary seal 55 in the form of a four-lip seal in an annular groove of the cover element 53, which four-lip-seal provides a sealing contact with an outer face of the coupling hub 36. A bearing bush 74 arranged in a recess of the cover element 53 and serving to radially support the coupling hub 36 is positioned so as to axially adjoin the rotary seal 55. The cover element 53 comprises an outer thread 56 by means of which it is threaded into an inner thread of the coupling cage 34, so that both, jointly, form a unit. The cover element 53—if viewed in half a longitudinal section—is C-shaped and forms an annular chamber which is open towards the bearing support 19 and which is entered by the magnet coil 23. The magnet coil 23 is secured on a sleeve projection of a holding element 27 which, in turn, is firmly connected to the bearing support 19. For this purpose, the holding element 27 comprises a second sleeve projection 28 which is axially opposed to the first sleeve projection by means of which it is pressed into a corresponding bore 29 of the bearing support 19. The holding element 27 and the bearing support 19 each comprise an axial bore, which two bores are aligned relative to one another and serve as a cable duct 30 for a power cable controlling the magnet coil 23. The cable duct 30 simultaneously has the function of serving as rotary securing means of the holding element 27 relative to the bearing support 19. The bearing support 19 comprises at least one circumferentially distributed holding arm or clip 32 for being connected to an engine component 33.

At its differential end, the coupling cage 34 with its sleeve projection 38 is sealed by a contacting rotary seal 48, which is provided in the form of a radial shaft sealing ring, and an axially adjoining non-contacting annular seal 51, which is secured on the sleeve projection 38 and covers the annular chamber formed between the differential housing and the sleeve projection 38. At its joint end, the coupling cage 34 is sealed relative to the bearing support 19 by a non-contacting rotary seal 49 which—if viewed in half a longitudinal section—is Z-shaped and is secured on the cylindrical part 44 and, by means of an axial annular portion, axially extends over a cylindrical outer face of the bearing support 19. For supporting the coupling cage 34 relative to the bearing support 19, there is provided a rolling contact bearing 58 which, by means of its inner bearing race, is arranged in an internally cylindrical bore in the free end of the coupling cage 34. The supporting means are such that on the radial inside and outside, there are formed minimal radial gaps between the cover element 53 and the holding element 27. The rolling contact bearing 58 is axially supported, by means of its inner bearing race, against an abutment face of the bearing support 19 and, by means of its outer bearing race, against a radial face of the holding element 27. The cylindrical portion 44 of the coupling cage 34 enters an axially open annular chamber of the bearing support 19. The rolling contact bearing 58 is sealed at both ends by sealing discs, so that, in addition to the rotary seal 49, it has further sealing functions.

The coupling hub 36 is provided in the form of a sleeve which is slid on to the intermediate shaft 12 and connected thereto in a rotationally fixed way via longitudinal teeth 45. The axial securing means are formed, on the one hand, by a tooth run-out of the longitudinal teeth 45 and, on the other hand, by a shoulder 47 of the coupling hub, which shoulder 47 supports the inner bearing race of the bearing 42. The radial gap formed between the intermediate shaft 12 and the coupling hub 36 is sealed a sealing ring 46 which is arranged in an inner annular groove of the coupling hub 36. In this way, transmission oil is prevented from escaping from the differential 4.

Figure 2:
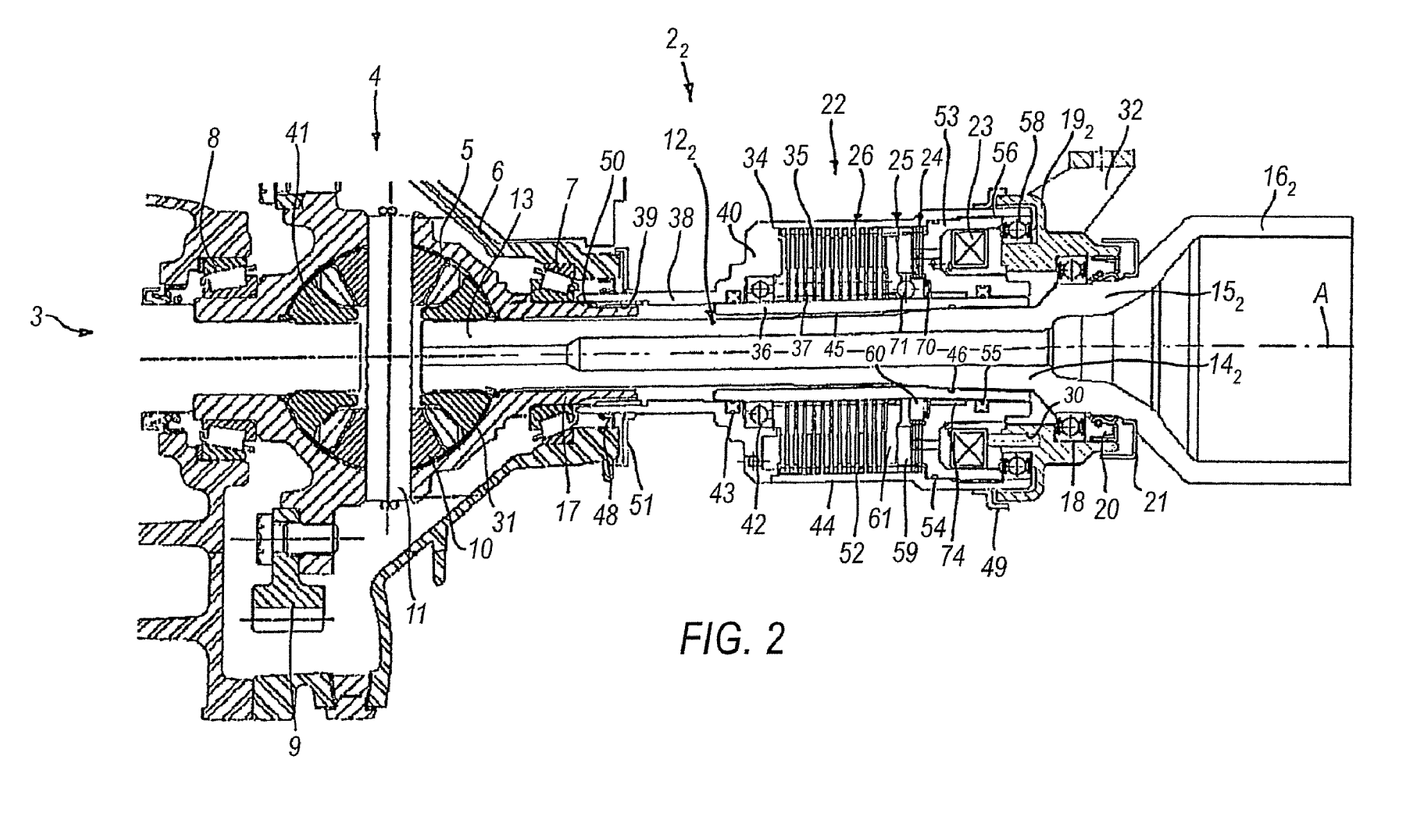
FIG. 2 is a longitudinal section through an inventive drive assembly in a second embodiment.

FIG. 2 shows an inventive drive assembly in a second embodiment which largely corresponds to that shown in FIG. 1. To that extent, as far as the common features are concerned, reference is made to the above description, with identical components having been given the same reference numbers and modified components having been given reference numbers having been provided with the subscript "2". The only difference from the embodiment according to FIG. 1 is that the intermediate shaft $12_2$ of the present drive assembly is produced so as to be integral with the outer joint part $16_2$ of the constant velocity universal joint to be connected. At its joint end, the intermediate shaft $12_2$ is rotatably supported by the rolling contact bearing 18 relative to the bearing support $19_2$.

Figure 3:
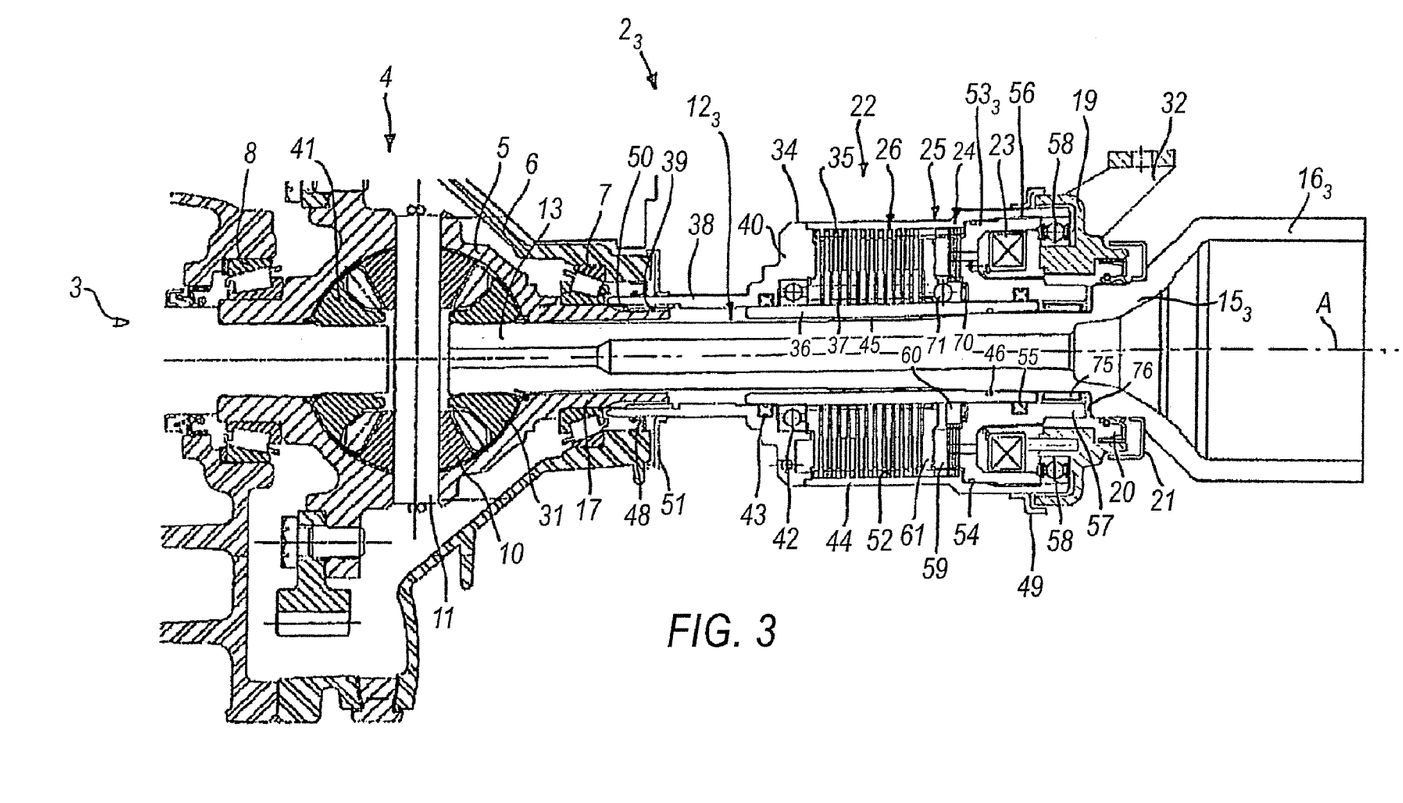
FIG. 3 is a longitudinal section through an inventive drive assembly in a third embodiment.

FIG. 3 shows an inventive drive assembly in a third embodiment which largely corresponds to that shown in FIG. 2. To that extent, as far as the common features are concerned, reference is made to the above description, with identical components having been given the same reference numbers and modified components having been given reference numbers provided with the subscript "3". The present drive assembly differs from the embodiment according to FIG. 2 in that the intermediate shaft $12_3$, at its joint end, is not directly rotatably supported in the bearing support but in a sleeve projection 57 of the cover element $53_3$. The bearing means in this embodiment are provided in the form of a needle bearing 75 which is arranged on a cylindrical outer face of the intermediate shaft 12. It is also possible to use other bearings such as a polygon bearing. For axially supporting the intermediate shaft, there is provided an axial bearing 76 which is positioned between a radial shoulder of the intermediate shaft 12 and the radial end face of the sleeve projection 57. The cover element $53_3$ is firmly connected to the coupling cage 34 which, in turn is rotatably supported via the rolling contact bearing 58 on an axial projection of the bearing support 19. Thus, the intermediate shaft $12_3$ of the present embodiment is indirectly radially supported relative to the bearing support 19 via the cover part $53_3$ and the coupling cage 34. A further difference relative to the above embodiment consists in that the present embodiment does not comprise a bearing bush between the coupling hub 36 and the cover element $53_3$.

Figure 4:
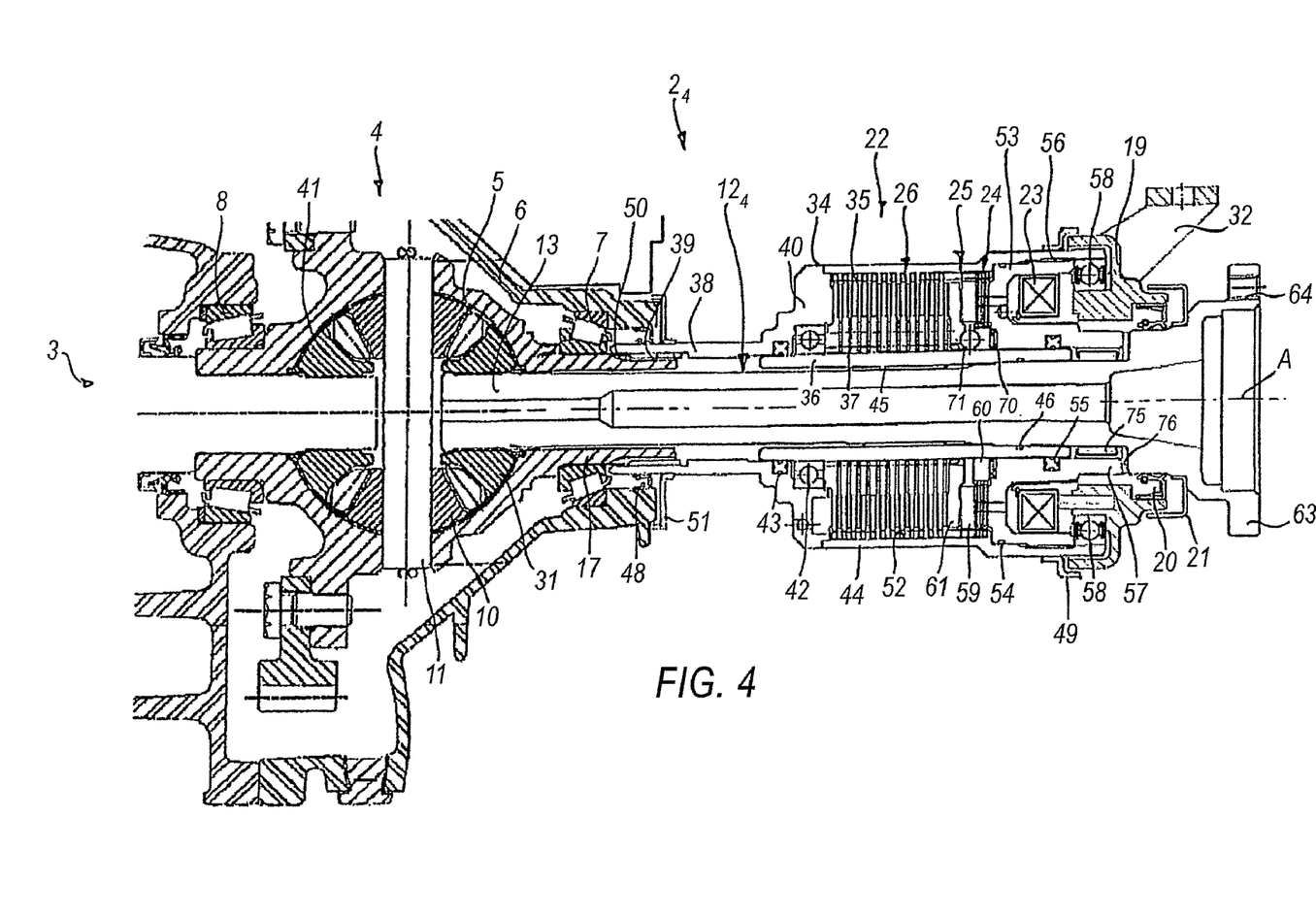
FIG. 4 is a longitudinal section through an inventive drive assembly in a fourth embodiment.

FIG. 4 shows an inventive drive assembly in a fourth embodiment which largely corresponds to that shown in FIG. 3. To that extent, as far as the common features are concerned, reference is made to the above description, with identical components having been given the same reference numbers and modified components having been given reference numbers provided with the subscript "4". The present drive assembly differs from the embodiment according to FIG. 3 in that the intermediate shaft $12_4$, at its outer end, is produced so as to be integral with a shaft flange 63. The shaft flange 63 has to be connected in a rotationally fixed way to an outer joint part of a constant velocity universal joint (not illustrated). This is achieved in a conventional way by bolts which are threaded into circumferentially distributed bores 64 of the shaft flange 63. In this embodiment, the constant velocity universal joint is provided in the form of a disc joint, for example in the form of a VL plunging joint. The constant velocity universal joint forms part of the sideshaft which serves to transmit torque to the associated front wheel.

Figure 5:
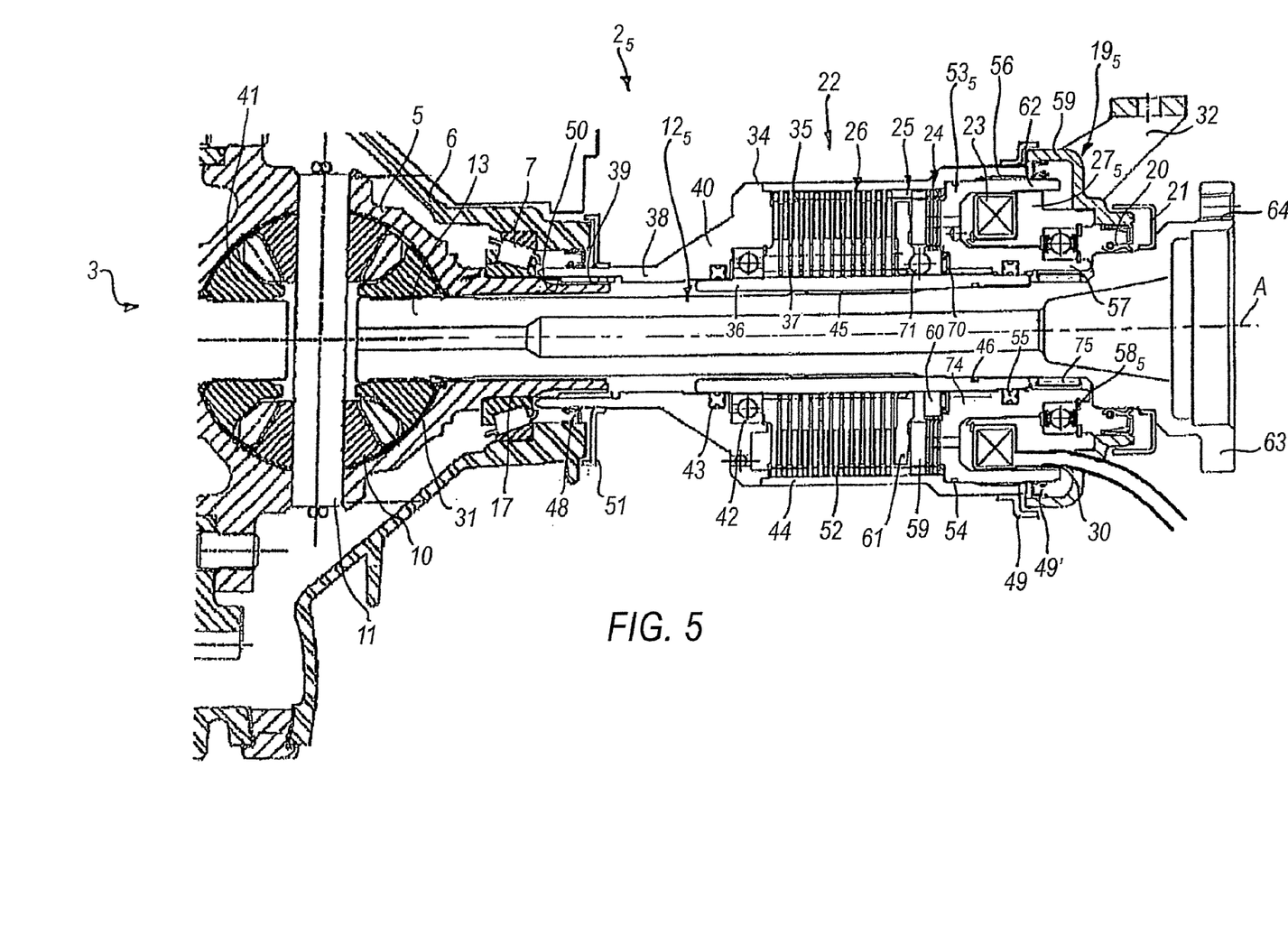
FIG. 5 is a longitudinal section through an inventive drive assembly in a fifth embodiment.

FIG. 5 shows an inventive drive assembly in a fifth embodiment which largely corresponds to that shown in FIG. 4. To that extent, as far as the common features are concerned, reference is made to the above description, with identical components having been given the same reference numbers and modified components having been given reference numbers provided with the subscript "5". The present drive assembly differs from the embodiment according to FIG. 4 in that instead of the coupling cage, the cover element $53_5$ is rotatably supported relative to the bearing support $19_5$ via a holding element $27_5$. For this purpose, the rolling contact bearing $58_5$, by means of its inner bearing race, is arranged on the cylindrical outer face of the sleeve projection 57, whereas the outer bearing race is positioned in an inner cylindrical bore of the sleeve element $27_5$ which, in turn, is firmly connected to the bearing support $19_5$. In consequence, it is possible, in the present embodiment, to use bearing means with a smaller diameter, which results in weight advantages. Furthermore, the inner bearing means 75 arranged between the intermediate shaft $12_5$ and the cover element $53_5$ on the one hand and the outer bearing means $58_5$ arranged between the cover element $53_5$ and the holding element $27_5$ on the other hand are located in one plane, so that any bending moments occurring in operation can be well supported. Furthermore, it can be seen that a bearing bush 74 is inserted between the cover element $53_5$ and the coupling hub 36. A further difference relative to the above embodiment refers to a seal between the coupling unit and the bearing support $19_5$. It can be seen that in the present embodiment, there are provided two sealing means 49, 49' between the coupling unit and the bearing support $19_5$. In addition to the first sealing means 49 which are secured at the free end of the cylindrical portion 44 and axially cover the sleeve portion 59 of the bearing support 19, there are provided second sealing means 49' provided in the form of a radial shaft sealing ring. The radial shaft sealing ring is arranged in the sleeve portion 59 of the bearing support $19_5$ and provides a sealing contact with the outer cylindrical face of the cover element $53_5$. The cover element $53_5$ comprises a sleeve projection 62 which axially projects beyond the free end of the cylindrical portion 44 and which enters the annular chamber of the bearing support $19_5$ which is formed inside the sleeve portion 59. Furthermore, it is possible to see the cable duct 30 for actuating the magnet coil.

Figure 6:
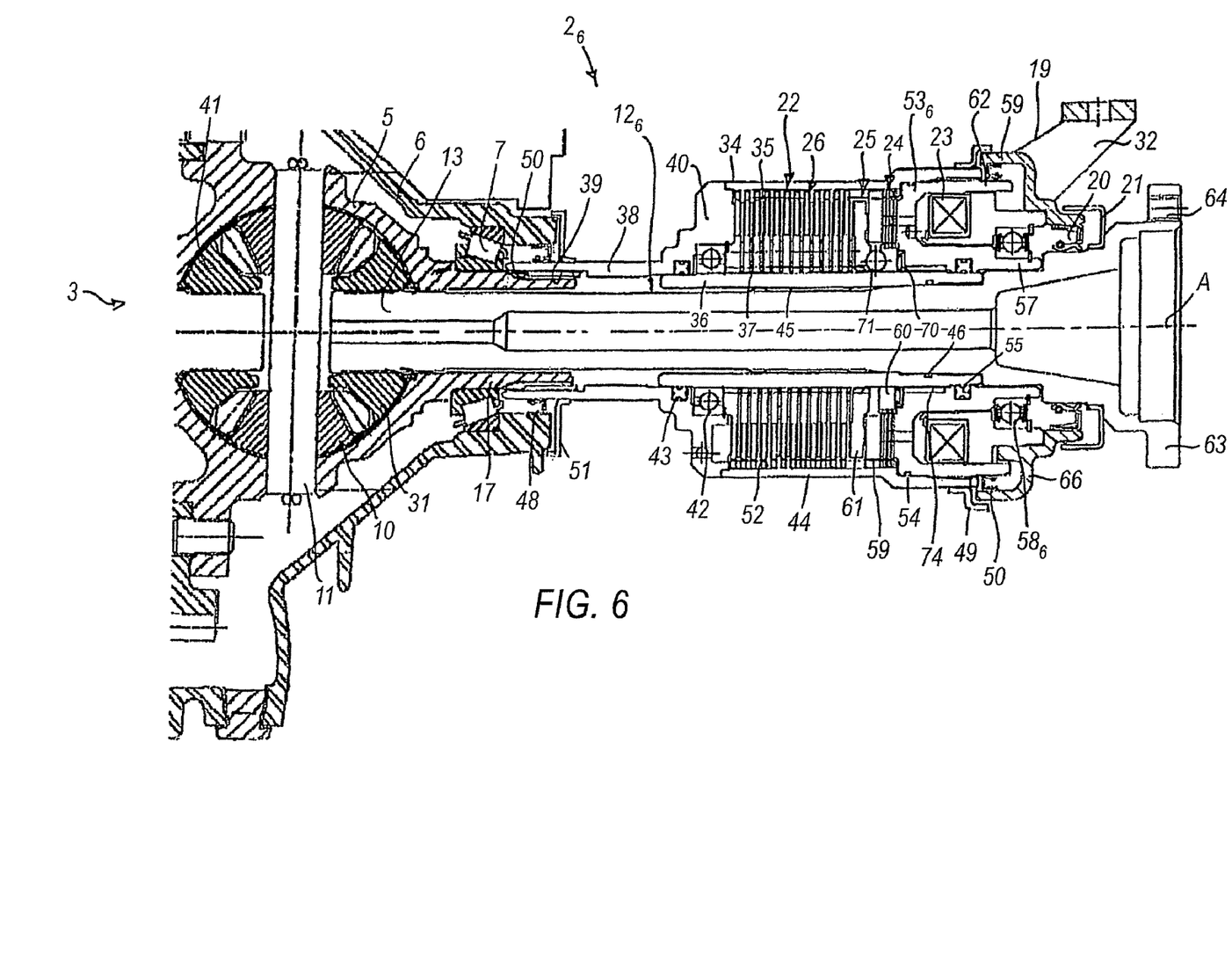
FIG. 6 is a longitudinal section through an inventive drive assembly in a sixth embodiment.

FIG. 6 shows an inventive drive assembly in a sixth embodiment which largely corresponds to that shown in FIG. 5. To that extent, as far as the common features are concerned, reference is made to the above description, with identical components having been given the same reference numbers and modified components having been given reference numbers provided with the subscript "6". The present embodiment differs from the above-described embodiment in that the present embodiment does not comprise any additional bearing means between the intermediate shaft $12_6$ and the cover element $53_6$. Radial support for the intermediate shaft $12_6$ is effected via the coupling hub 36 which is rotatably supported relative to the cover element $53_6$ by the bearing bush 74.

Figure 7:
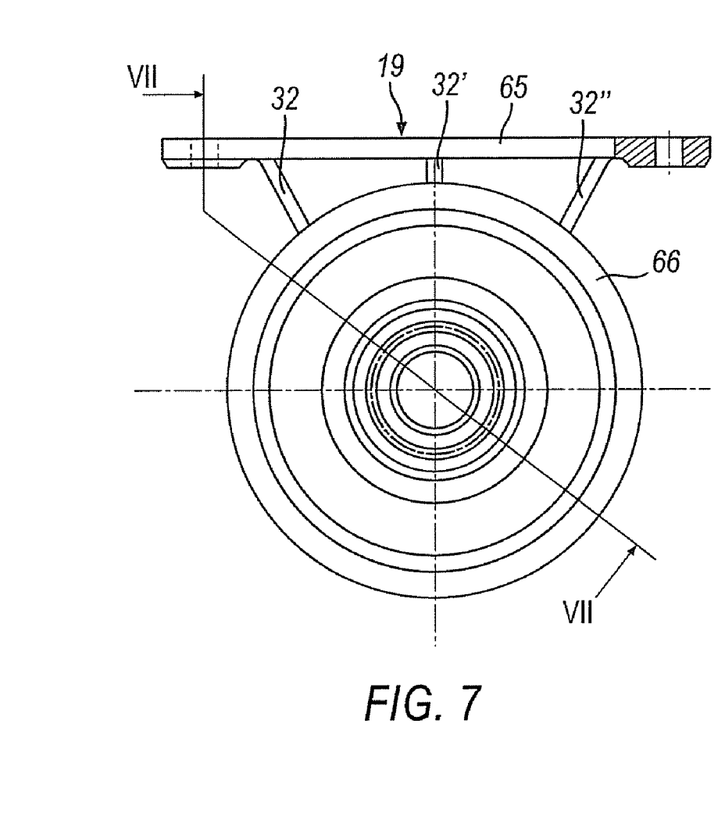
FIG. 7 shows the drive assembly according to FIG. 1 to 6 in an axial view.

FIG. 7 is an axial view of the drive assembly according to any one of FIGS. 1 to 6, wherein the longitudinal sections shown in FIGS. 1 to 6 correspond to the sectional line VII-VII shown in FIG. 7. More particularly, it is possible to see the bearing support 19 which comprises an attaching plate 65 for threading on an engine part (not illustrated) and three holding arms 32. The holding arms 32, in turn, carry the annular member 66 relative to which the coupling unit 22 is rotatably supported and sealed.

Figure 8:
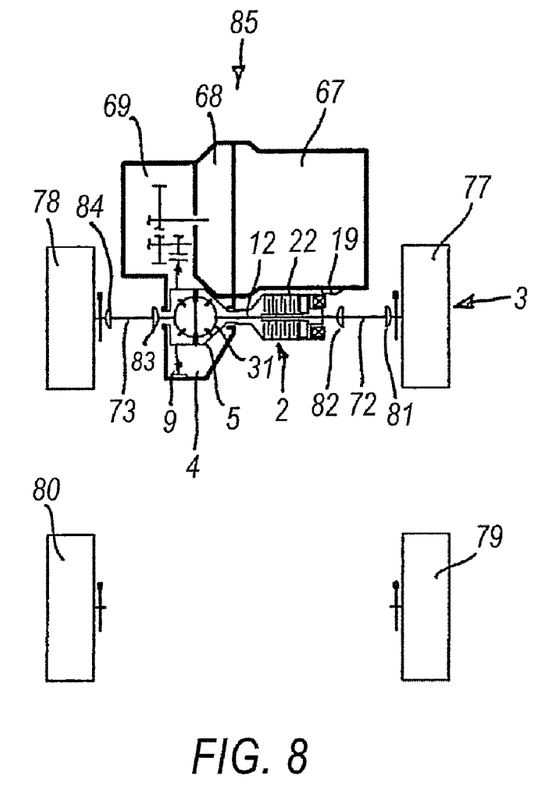
FIG. 8 shows the driveline of a motor vehicle with a front axle drive in a first embodiment with an inventive drive assembly according to one of FIGS. 1 to 6 in a diagrammatic illustration.

FIG. 8 is a diagrammatic illustration of the driveline of a front wheel drive motor vehicle 85 whose engine 67 is mounted transversely relative to the vehicle axis. The Figure illustrates the front axle 3 with a right-hand and left-hand front wheel 77, 78 and the rear wheels 79, 80. Next to the engine 67, it is possible to see the clutch 68 and the gearbox 69 via which the torque is introduced into the axle differential 4. For this purpose, there is provided an annular gear 9 which is firmly connected to the differential carrier 5 and which is driven by a driving pinion. From the axle differential 4, the introduced torque is distributed to the two sideshaft gears. It can be seen that the axle differential 4 is arranged eccentrically relative to the longitudinal axis of the vehicle, so that for the transmission of torque to the equally long sideshafts 72, 73 it is necessary to bridge distances of different lengths. Whereas the left-hand sideshaft 73 directly adjoins the sideshaft gear of the axle differential 4, on the right-hand side, there is connected a drive assembly 2 according to any of the above embodiments having an intermediate shaft 12 and a coupling unit 22, with the intermediate shaft 12 of the drive assembly 2 serving to transmit torque from the right-hand sideshaft gear 31 to the associated sideshaft 72. Each of the two sideshafts 72, 73 comprises two constant velocity universal joints 81, 82, 83, 84 of which it is common practice to provide the inner ones in the form of plunging joints and the outer ones in the form of fixed joints. By means of the coupling unit 22 arranged coaxially relative to the intermediate shaft 12 it is possible actively to lock a differential movement between the two sideshaft gears of the axle differential, if required, so that the driving dynamics of the motor vehicle are improved.

Figure 9:
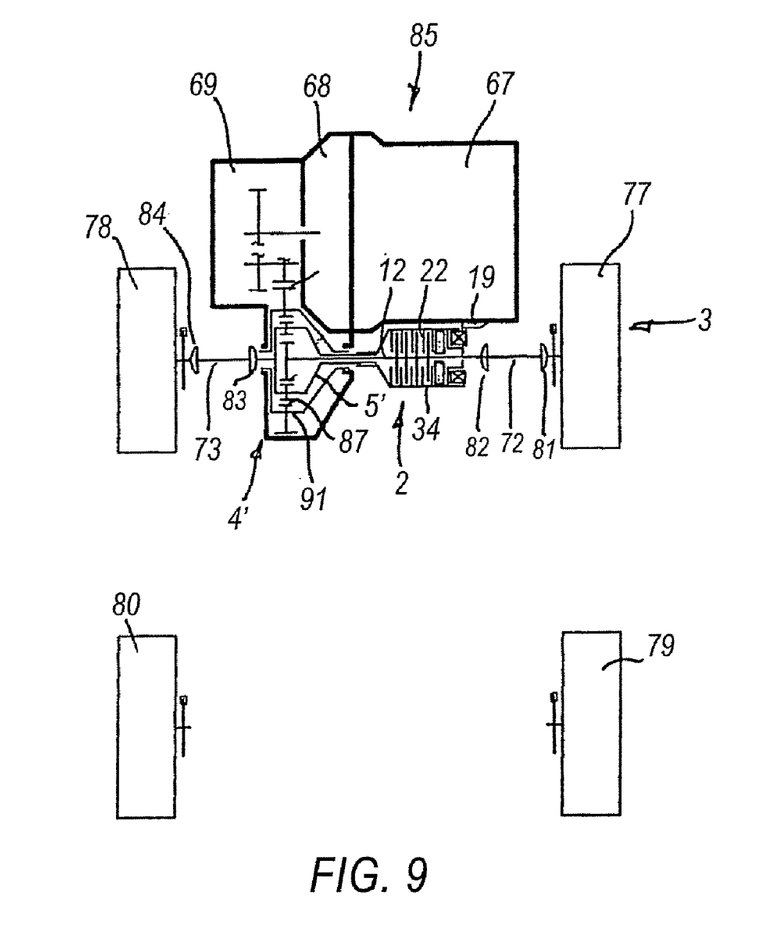
FIG. 9 shows the driveline of a motor vehicle with a front axle drive in a second embodiment with an inventive drive assembly according to one of FIGS. 1 to 6 in a diagrammatic illustration.
Figure 10:
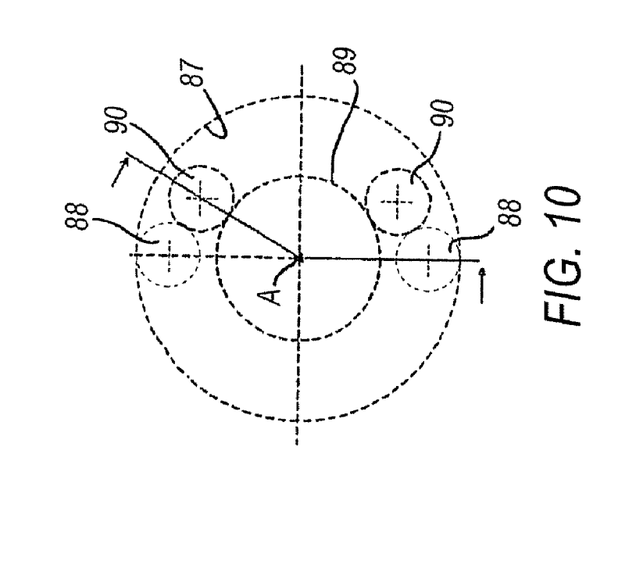
FIG. 10 diagrammatically shows the double planetary differential according to FIG. 9 in a cross-sectional view.

FIGS. 9 and 10 which will be described jointly below diagrammatically illustrate a driveline in a second embodiment which largely corresponds to the embodiment according to FIG. 8 to the description of which reference is hereby made as regards their common features. Identical components have been given the same reference numbers, the reference numbers of different components have been provided with an apostrophe. The only difference relative to the embodiment according to FIG. 8 consists in that instead of a bevel gear differential, the present embodiment is provided with a double planetary differential 4' in the form of the axle differential. This comprises a support 91 which is rotatingly driven around the axis of rotation A by an annular gear 9, a hollow gear 87 which is connected to the support 91 in a rotationally fast way and whose teeth engage those of the planetary gears 88, and a sun gear 89 which is rotatably supported on the axis of rotation A and whose teeth engage those of the second planetary gears 90. One first planetary gear 88 and a second planetary gear 90 engage one another and form a pair from which there originates the term "double planetary differential". The pairs of planetary gears 88, 90 are rotatably supported in the differential carrier 5' which, on the one hand, is connected to the coupling cage 34 in a rotationally fixed way and, on the other hand, to the sideshaft 73. The differential carrier 5' which, when used with planetary differentials, is also referred to as a web, thus forms, in addition to the sun gear 89, a second output of the axle differential. The sun gear 89 is connected to the intermediate shaft 12 in a rotationally fixed way, which, in turn, is connected to the coupling hub 36 in a rotationally fixed way. Thus, by closing the coupling unit 22, the intermediate shaft 12 can be coupled to the differential carrier 5', which results in a reduction in the speed differential between the two sideshafts 72, 73.

Overall, the drive assemblies in accordance with the invention are advantageous in that they feature a compact and simple design. To integrate them into the front axle, it is merely necessary to connect the bearing support 19 to an attaching part of the engine and gearbox 67 respectively. There is no need for additional modifications of the differential housing or other components, which has an advantageous effect on costs.

Figure 11:
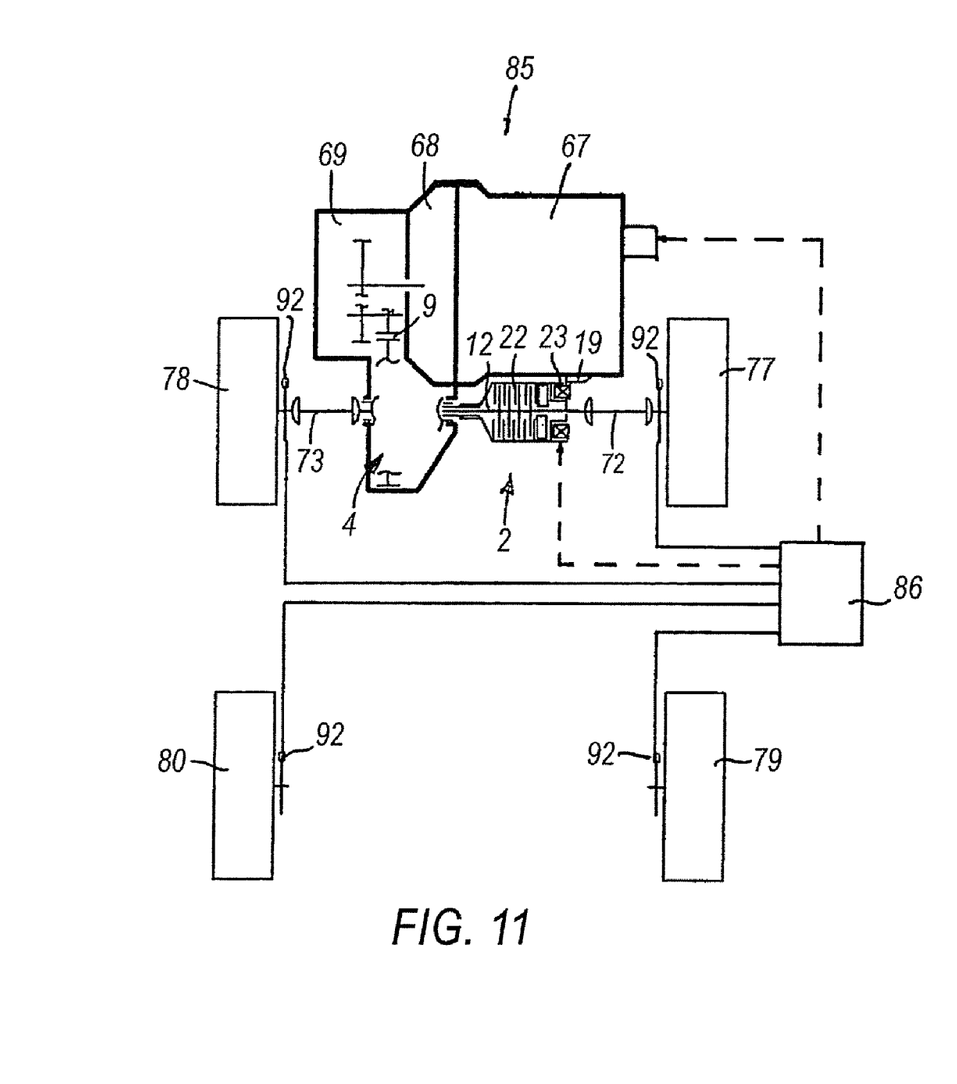
FIG. 11 shows the driveline according to FIG. 8 or 9 with a control unit for controlling the degree of locking of the coupling unit.

FIG. 11 shows a further aspect of the invention which concerns the electronic integration of the coupling unit 22. FIG. 11 contains a diagrammatic illustration of the motor vehicle driveline which corresponds to that shown in FIGS. 8 and 9. To that extent and as far as design and mode of functioning are concerned, reference is made to the above description, with identical components having been given the same reference numbers. The axle differential 4 can have any design, for example it can be provided in the form of a conical gear differential or double planetary differential. There is illustrated a control unit 86 which is provided for controlling the driving dynamics of the motor vehicle and which is also referred to as Electronic Control Unit (ECU). Data recorded at the wheels 77, 78, 79, 80 by sensors 92 are transmitted to the control unit 86, a process which is illustrated by continuous lines. Such sensor-recorded data can be rotational speeds or ABS signals of the wheels. These data are used to generate control signals which, for example by interfering with the brakes, can influence the yaw behaviour of the motor vehicle, thus ensuring an increased driving stability, and the same electronic control unit 86 which serves to control the driving dynamics is also used for controlling the coupling unit 22. The control of the coupling unit 22 and of the engine 67 is illustrated by dashed lines. In addition to easily mechanically integrating the coupling unit 22 into the driveline of the motor vehicle, there is also achieved an easy electronic integration because the control of the coupling unit 22 is effected by a control unit 86 which has been provided in any case. The control unit 86 can carry out further control functions by intervening with the engine management system, for example in order to vary the torque generated for being transmitted to the driveline. Other control functions can be the steering or gearbox management or traction control of the wheels. In connection with an electronic integration, using the coupling unit 22 with the pilot coupling 24 and main coupling 26 is particularly advantageous because only a low amperage of less than 5 ampere is required for controlling purposes.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

The invention claimed is:

1. A drive assembly for use in the axle drive of a motor vehicle between an axle differential and a sideshaft, comprising:
    an intermediate shaft supported so as to be rotatable around an axis of rotation (A), said intermedial shaft having a first end connected to an output gear of the axle differential in a rotationally fixed way and a second end connected at least indirectly to the sideshaft in a rotationally fixed way;
    a controllable coupling unit arranged coaxially relative to said intermediate shaft and comprising a coupling cage with outer plates and a coupling hub with inner plates, said coupling cage connected in a rotationally fixed way to a differential carrier of the axle differential, said coupling cage rotatably supported around said axis of rotation (A) relative to a bearing support, said coupling hub connected in a rotationally fixed way to said intermediate shaft, wherein said outer plates and said inner plates are arranged so as to axially alternate and jointly form a plate package; and
    wherein said coupling cage extends in the axial direction from said differential carrier to said bearing support; wherein at its end facing the axle differential, said coupling cage sealed by means of a first rotary seal relative to a housing of the axle differential and, at its end facing said bearing support, said coupling cage is sealed by means of a second rotary seal relative to said bearing support, wherein said coupling cage forms a closed housing.

2. A drive assembly according to claim 1, wherein said coupling unit comprises a magnet coil, a pilot coupling controlled by said magnet coil, a ramp mechanism actuated by said pilot coupling and a main coupling actuated by said ramp mechanism, said coupling unit comprising said coupling cage and the coupling hub.

3. A drive assembly according to claim 1, wherein said coupling cage comprises an attaching sleeve connected to said differential carrier in a rotationally fixed way, a bottom part adjoining said attaching sleeve, and a tubular part adjoining said bottom part and whose free end is sealed relative to said bearing support.

4. A drive assembly according to claim 3, wherein said attaching sleeve is connected in a rotationally fixed way to a sleeve projection of said differential carrier by means of a plug-in connection.

5. A drive assembly according to claim 1, further comprising a cover element rotatably supported relative to said bearing support by means of a bearing, said cover element closing said coupling cage.

6. A drive assembly according to claim 5, wherein at its end remote from the axle differential, said intermediate shaft is rotatably supported relative to said bearing support.

7. A drive assembly according to claim 5, wherein said coupling cage, said cover element and said coupling hub enclose an outwardly sealed annular chamber, wherein a pilot coupling, a ramp mechanism and a main coupling are arranged inside said annular chamber and a magnet coil is arranged outside said annular chamber.

8. A drive assembly according to claim 6, wherein said cover element, if viewed in half a longitudinal section, is C-shaped and forms an annular chamber which is open towards an axial end and which accommodates a magnet coil.

9. A drive assembly according to claim 8, wherein said magnet coil is fixed to a holding element which axially delimits said annular chamber and is firmly connected to said bearing support.

10. A drive assembly according to claim 9, wherein said holding element is produced out of a ferromagnetic material.

11. A drive assembly according to claim 9, wherein said cover element comprises an inner sleeve portion which, by means of a bearing, is supported relative to said holding element so as to be rotatable around said axis of rotation (A), wherein radial gaps are formed between said cover element and said holding element.

12. A drive assembly according to claim 1, wherein said coupling hub is provided in the form of a sleeve which is held in a rotationally fixed way on said intermediate shaft by means of longitudinal toothing.

13. A drive assembly according to claim 3, wherein said coupling cage is rotatably supported on said coupling hub by means of a bearing received in said bottom part, and said coupling cage sealed relative to said coupling hub by means of a rotary seal.

14. A drive assembly according to claim 1, further comprising a cover element sealed, on its radial inside, by means of a rotary seal relative to a coupling hub, said cover element sealed, on its radial outside, by means of a sealing ring relative to a tubular part.

15. A drive assembly according to claim 1, wherein said bearing support comprises at least one holding arm for providing a connection with an engine or transmission component of the motor vehicle.

16. A drive assembly according to claim 1, further comprising an electronic control unit which, as a function of at least one vehicle parameter, controls the degree of locking of said coupling unit and at least one further system of the motor vehicle.

17. A drive assembly according to claim 16, wherein said electronic control unit includes an electronic stability program (ESP) which controls the driving dynamics of the motor vehicle.

18. A drive assembly according to claim 16, wherein said electronic control unit carries out at least one control function taken from the group of an engine management system, a transmission management system, an antilock braking system of the brakes, or of a traction control system of the wheels of the motor vehicle.

19. A drive assembly according to claim 16, wherein said electronic control unit controls said coupling unit with an amperage of less than five ampere.

20. A drive assembly for use in the axial drive of a motor vehicle, comprising:
an axle differential;
a sideshaft;
an intermediate shaft supported to be rotatable around an axis of rotation (A), said intermediate shaft portion having a first end connected to an output gear of said axial differential in a rotationally fixed way and a second end connected at least indirectly to said sideshaft in a rotationally fixed way;
a controllable coupling unit arranged coaxially to said intermediate shaft and comprising a coupling cage having outer plates and a coupling hub having inner plates, said coupling cage connected in a rotationally fixed way to a differential carrier of said axle differential, said coupling cage rotatably supported around said axis of rotation (A) relative to a bearing support, said coupling hub connected in a rotationally fixed way to said intermediate shaft, said outer plates and said inner plates arranged so as to axially alternate and jointly form a plate package;
wherein said coupling unit comprises:
a magnetic coil;
a pilot coupling controlled by said magnetic coil;
a ramp mechanism actuated by said pilot coupling; and
a main coupling actuated by said ramp mechanism;
wherein said coupling cage extends in an axial direction from said differential carrier to said bearing support;
wherein said coupling cage is sealed by means of a first rotary seal at an end facing said axial differential;
wherein said coupling cage is sealed by means of a second rotary seal at an end facing said bearing support; and
wherein said coupling cage forms a closed housing.

21. A drive assembly according to claim 20, further comprising:
a cover element rotatably supported relative to said bearing support by means of a bearing, said cover element closing said coupling cage.

22. A drive assembly according to claim 21, wherein said coupling cage, said cover element and said coupling hub enclose an outwardly sealed annular chamber;
wherein said pilot coupling, said ramp mechanism, and said main coupling are arranged inside said annular chamber; and
wherein said magnetic coil is arranged outside said annular chamber.

* * * * *